(12) United States Patent
Baroni et al.

(10) Patent No.: US 6,662,308 B1
(45) Date of Patent: Dec. 9, 2003

(54) DUAL-HOMING SELECT ARCHITECTURE

(75) Inventors: Stefano Baroni, Red Bank, NJ (US); Bharat Tarachand Doshi, Holmdel, NJ (US); Paramasiviah Harshavardhana, Marlboro, NJ (US); Muhammed Akber Qureshi, Metuchen, NJ (US); Antonio Rodriguez-Moral, North Brunswick, NJ (US); David Sugarmen, Lincroft, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/468,714

(22) Filed: Dec. 21, 1999

(51) Int. Cl.[7] ................................................ G06F 11/00
(52) U.S. Cl. ............................ 714/4; 714/43; 709/223
(58) Field of Search ........................ 714/4, 43; 709/223

(56) References Cited

U.S. PATENT DOCUMENTS

2003/0039210 A1 * 2/2003 Jin et al.

* cited by examiner

Primary Examiner—Scott Baderman
Assistant Examiner—Christopher S. McCarthy

(57) ABSTRACT

A network architecture comprised of nodes and a transport network capable of recovering from failures within the network. The network architecture incorporates select functions into the nodes for managing the data flow between individual edge routers and their connection through core routers to the transport network. The select function allows an individual node to recover independently without signaling other nodes over the transport network. Utilizing the select function, the failure of a single core router can be recovered locally without recovery signaling over the transport network.

22 Claims, 5 Drawing Sheets

DUAL-HOMING SELECT ARCHITECTURE

FIELD OF THE INVENTION

The present invention relates to data telecommunication networks. More particularly, the present invention relates to a network survivability scheme for use in a data telecommunication network.

BACKGROUND OF THE INVENTION

Traditionally, data telecommunication networks have been designed to carry traffic with "best effort" characteristics. In a system using best efforts, in the event of a failure the system will attempt to reroute data signals, but will discard the data if the attempt at rerouting is not successful. The explosive growth of the Internet and the increasing importance of the information exchanged over it leads to the need for highly reliable data networks. To reliably manage larger quantities of information, superior survivability schemes for managing the flow of data need to be implemented. A survivability scheme provides a network with a procedure for rerouting data being conveyed over the network in the event of a failure in the network.

Routers are devices for managing the flow of data over a network. Currently, routers are responsible for communicating with other routers and choosing between multiple paths when sending data over the network to routers located in other parts of the network. In choosing between multiple paths, a router will select the most efficient path (based on some measurement, e.g., distance, cost, . . . ) between two locations (referred to hereafter as a network node, or simply node) and will automatically reroute data in the event of system failures. Generally, a data network consists of multiple nodes and a transport network. An individual node represents the router hardware and software for directing the data, and a transport network represents the physical paths available to transmit data between nodes. Presently, if a failure occurs in one node, an indication of the failure is communicated to other network nodes so that the routers in these nodes become aware that a failure has occurred and can reroute the affected data appropriately.

One method for providing network reliability is by implementing dual-homing architecture in the nodes and connecting the nodes over a shared protection transport network. An example of this arrangement is depicted in FIG. 1. To facilitate discussion the edge routers 1–2 in node 1 will be referred to as source edge routers and the edge routers 3–4 in node 2 will be referred to as destination edge routers. Each edge router 1–4 can act as a source or destination edge router depending on the direction the data is flowing. In a dual-homing architecture system, the traffic from a source edge router 1 is directed or "homed" to two diverse core routers A and B so that the failure of a single core router can be tolerated. This scheme allows core router B to manage the data from edge router 1 if core router A fails and vice versa. If the path between edge router 1 and core router B is assigned as the primary path P and core router B fails, a secondary path S between edge router 1 and core router A could be used.

Likewise, a dual-homing architecture is implemented in node 2. In node 2, destination edge router 4 is homed to core routers C and D. If the path between edge router 4 and core router D is designated as the primary path P and the path between edge router 4 and core router C is designated as the secondary path S, a failure in core router D would have to be detected by edge router 4 so that edge router 4 would use the secondary path data.

Given the dual-homing approach between edge and core routers, the role of the transport network can be to either provide two diverse optical-pipes (primary and secondary) between each pair of core routers or enable sharing of protection capacity in order to recover from any transport network failure (e.g. link failure). FIG. 2 illustrates the network architecture where the transport network is just providing diverse optical pipes. (Note that unshared protection is provided between the pair of source-destination edge routers, implying that the protection-switching function is only required at the edge routers). This architecture can be realized by providing either (1+1) or (1:1) protection of edge-to-edge primary paths. In (1+1) architecture, the traffic is simultaneously fed into both primary and secondary paths. This enables the destination edge router to identify a failure by simply monitoring primary as well as secondary paths. In (1:1) architecture, under the no failure condition, the traffic is only fed into the primary paths, and when a failure occurs the traffic is switched to the secondary path for all the affected primary paths. This enables the system to use the protection capacity (secondary paths) for carrying preemptable traffic under normal conditions, but at the cost of complex signaling mechanisms that will considerably increase the restoration time. A third option is to split the traffic and use two diverse paths in a load sharing mode. Here, there is really no concept of primary and secondary paths. Each path becomes a back-up for the other. Each path is provisioned with enough capacity to handle traffic for both. Like (1:1) architecture, this approach also requires signaling to move the traffic from one path to the other.

Since (1+1) and (1:1) architectures use unshared protection, the amount of protection capacity must be large enough to carry the total network traffic (along secondary paths that are disjoint to the primary paths). If the total network traffic is T, then, from some real network design exercises, we know that additional capacity required for unshared protection is about 2T. This required protection capacity can be reduced if the transport network is able to provide shared protection for any failure in the transport network domain. FIG. 3 illustrates such an architecture. In this FIG., p(1), p(2), and p(3) (depicted by solid lines) represent optical pipes carrying primary traffic between nodes consisting of core routers (A and B) and (C and D), (E and F) and (C and D), and (G and H) and (C and D). The optical pipes reserved for carrying protection traffic (in case of a failure) are depicted by dotted lines. Note that the optical pipe p(4) can be shared for any failure affecting optical pipes p(1), p(2), and p(3), thus requiring less capacity than the unshared protection case. It is well known in the art that for some real networks that, compared to unshared protection, shared protection can save protection capacity on the order of 20% to 40%. Given the significant savings in protection capacity, high cost of long-haul optics, and availability of shared protection capability in today's transport networks, using shared protection in the transport network is an attractive option. However, it is still necessary to consider the recovery from a router failure in a node when shared protection is used in the transport network.

Like traditional multi-layer survivability schemes, transport network failures can be recovered by the shared protection transport network, and router failures can be recovered by using Internet Protocol—Multi Protocol Level Switching (IP-mpLS). However such nested multi-layer survivability schemes have major drawbacks. For example, they require that transport networks be provisioned for both the primary and protection paths of the nodes. This means that in addition to the transport network failure protection (provided by the transport network), the architecture is providing (1:1) protection for failures in the nodes. Depending on the availability of the network and type of services, the nodes may be required to protect only a fraction of the traffic, which in an extreme case is 100%. Such an architecture simplifies operation and management of the network by recovering node and transport network failures locally but results in substantially more capacity costs in the transport layer.

SUMMARY OF THE INVENTION

The present invention discloses a network architecture for combining a dual-homing approach in the nodes with a shared protection transport network. The network architecture removes the need for signaling between nodes over the transport network in the event of a router failure in one of the nodes. The network architecture incorporates select functions into the nodes for managing the data flow between individual edge routers and their connection through core routers to the transport network.

The select function determines whether failures have occurred in core routers within the node containing the select function and provides switching so that a single accurate data path is sent to the transport network. The select function eliminates the need for sending multiple data paths (e.g., a primary data path and a secondary data path to provide backup for the primary data path) and signaling (e.g., to indicate which path should be used) from the node over the transport network to other nodes. The select function allows the individual nodes to recover independently without signaling other nodes over the transport network, thereby eliminating the need for complex signaling mechanisms.

DETAILED DESCRIPTION OF THE INVENTION

Figure 1:
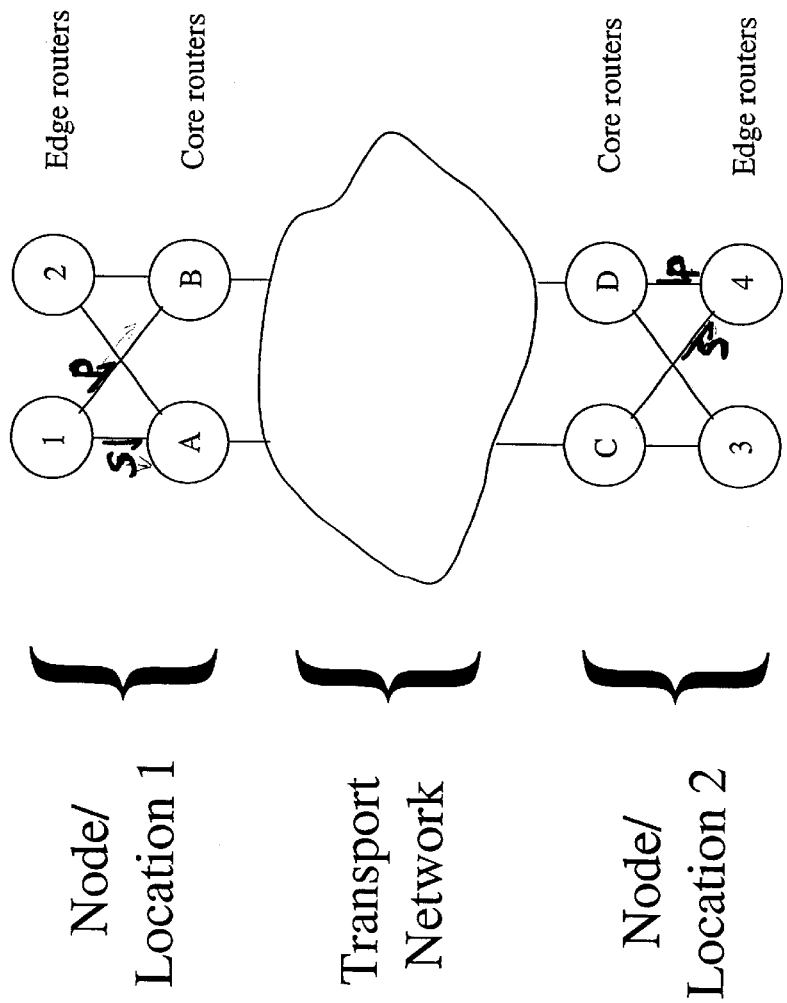
FIG. 1 is a block diagram of a prior art network architecture.
Figure 2:
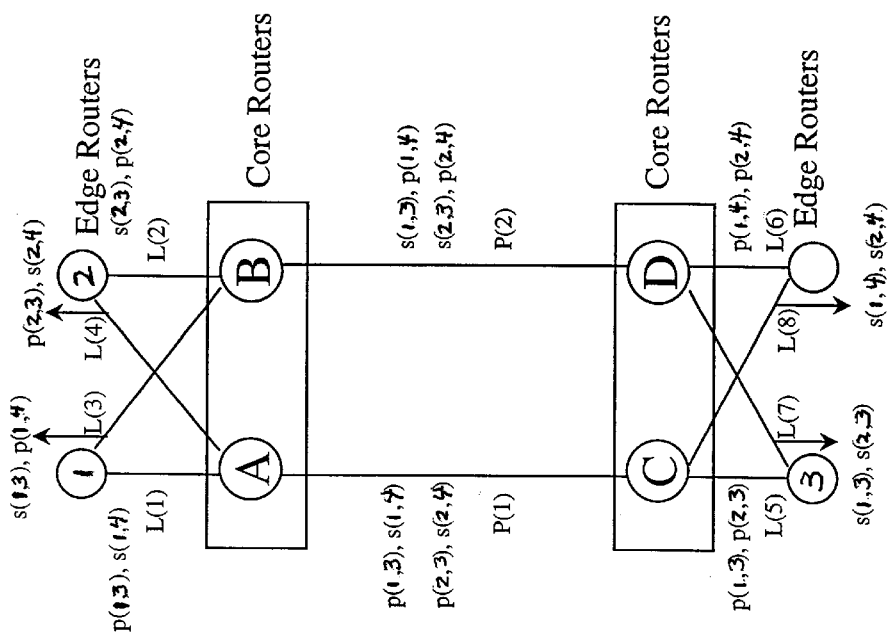
FIG. 2 is a block diagram of a prior art network architecture depicting an unshared protection scheme in the transport layer.
Figure 3:
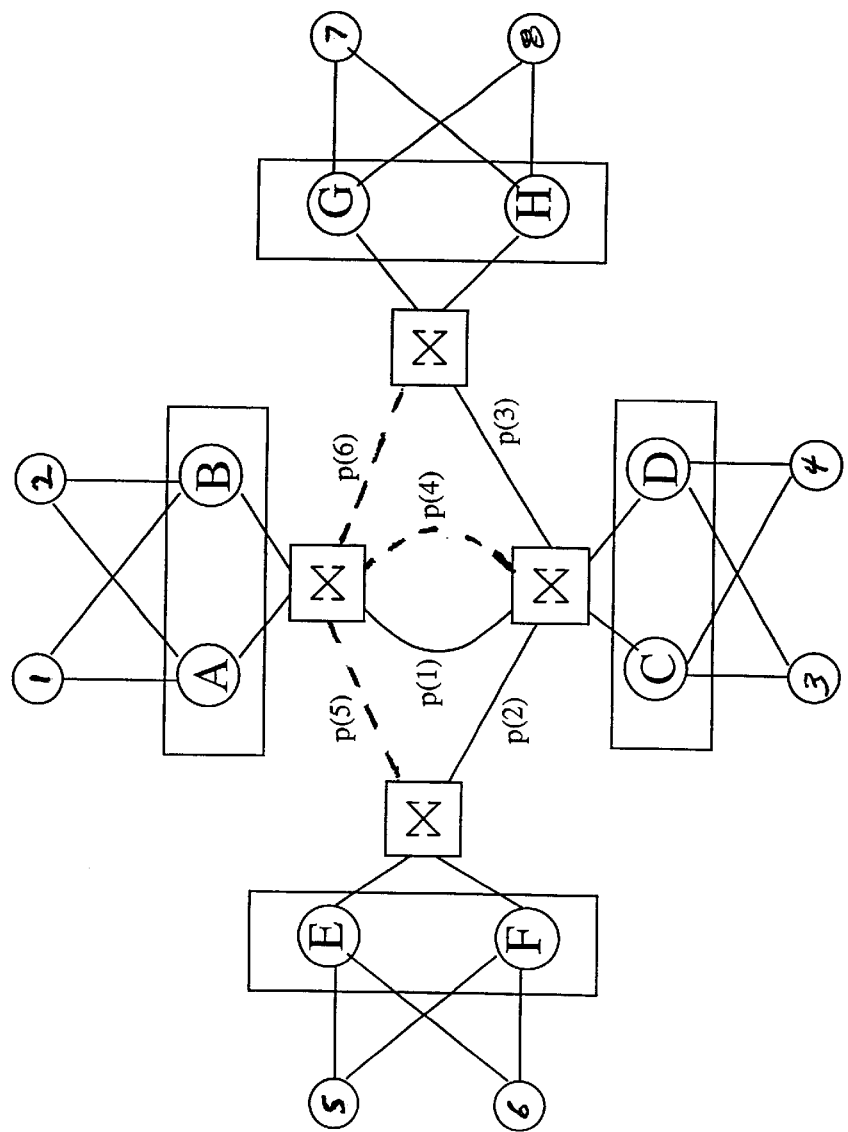
FIG. 3 is a block diagram of a prior art network architecture depicting a shared protection scheme in the transport layer.
Figure 4:
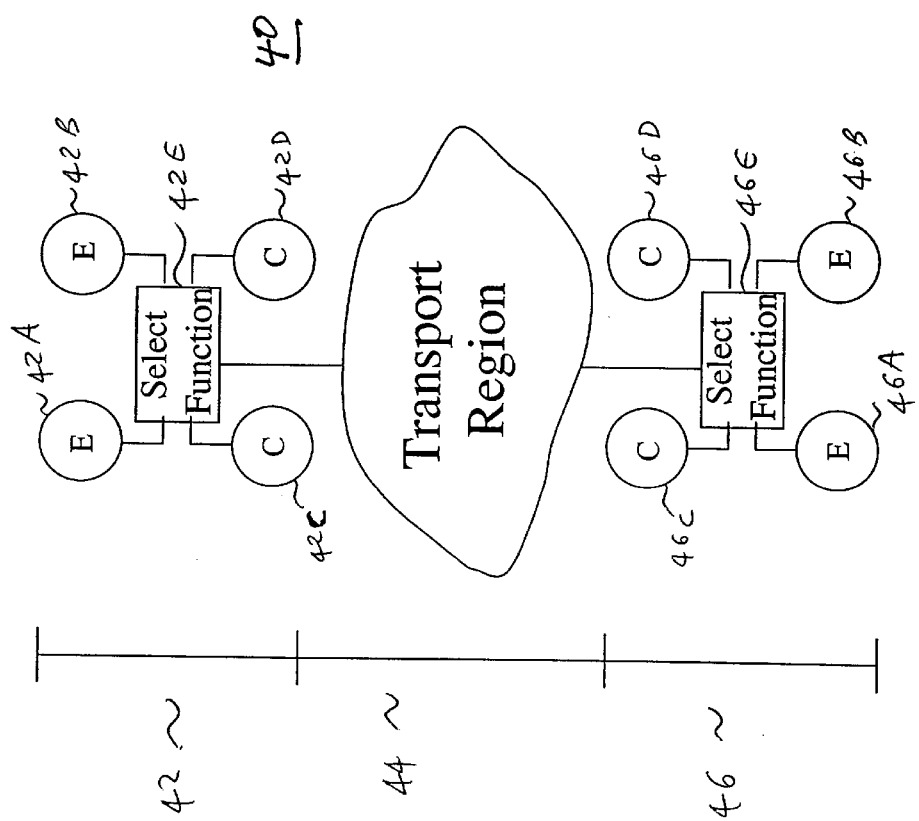
FIG. 4 is a block diagram of a network architecture in accordance with the present invention.

FIG. 4 discloses a network architecture 40 in accordance with the present invention.

The system comprises a first node 42, a transport region 44, and a second node 46. Each of the nodes 42 and 46, and the transport region 44 are capable of independently recovering from a network failure without requiring complex signaling between the nodes 42 and 46 over the transport region 44. The present invention removes the need for error signaling between individual nodes 42 and 46 over the transport region 44 in the event of a failure in one of the nodes 42 and 46, thus eliminating complex signaling mechanisms. First node 42 and second node 46 form a nodal system. A nodal system comprises more than one node with each node couplable to every other node within the system. In accordance with the present invention, failures within an individual node are detected and recovered within that node, and are not communicated between the individual nodes in the nodal system. In a preferred embodiment, the individual nodes of the nodal system are couplable through a transport region 44.

In the preferred embodiment, illustrated in FIG. 4, first node 42 comprises edge routers 42A and 42B, core routers 42C and 42D, and select function 42E; and second node 46 comprises edge routers 46A and 46B, core routers 46C and 46D, and select function 46E. Transport region 44 comprises a transport network. Transport networks are well known and are currently capable of independently detecting and recovering from any single failure in the transport region 44. Therefore, the specific manner in which independent recovery is accomplished in the transport region 44 is not central to the invention and is thus not described in detail herein.

To achieve independent recovery in each of the nodes 42 and 46, select functions 42E and 46E are introduced. Select functions 42E and 46E manage failures within their respective nodes 42 and 46. While first node 42 is discussed below, the explanation is equally applicable to second node 46. In the preferred embodiment, the select function 42E performs different operations on the outgoing traffic (traffic that is going from the edge routers 42A,B to the transport region 44) and the incoming traffic (traffic that is being received by the edge routers 42A,B from the transport region 44).

For outgoing traffic, in accordance with the preferred embodiment, a data signal from an edge router, such as edge router 42A, is simultaneously fed to a primary core router, such as core router 42C, and a secondary core router, such as core router 42D, to create a primary data signal and a secondary data signal, respectively. The select function 42E will then check the path containing the primary core router 42C to detect the presence of a failure in the path. For outgoing signals, the select function 42E selects and passes either the primary data signal or the secondary data signal to the transport region 44. In the absence of a failure in the path containing the primary core router 42C, the primary data signal is passed to the transport region 44. If a failure is detected in the path containing the primary core router 42C, the select function 42E selects and passes the secondary data signal to the transport region 44. This configuration removes the need for signaling from a first node 42 to a second node 46 over the transport region 44 to recover from a primary core router 42C failure in the first node for outgoing traffic. Therefore, an indication of a failure within a node does not need to be externally communicated by that node.

For incoming traffic, in accordance with the preferred embodiment, a data signal from the transport region 44 is simultaneously fed by the select function 42E to primary core router 42C and secondary core router 42D to create a primary data signal and a secondary data signal, respectively. The select function 42E will then check the path containing the primary core router 42C to detect the presence of a failure in the path. For incoming signals, the select function 42E directs an edge router, such as edge router 42A, to selects either the primary data signal or the secondary data signal. In the absence of a failure in the path containing the primary core router 42C, the primary data signal is used by the edge router 42A. If a failure is detected in the path containing the primary core router 42C, the select function 42E directs the edge router 42A to use the secondary data signal. This configuration removes the need for signaling from the first node 42 to the second node 46 over the transport region 44 to recover from a primary core router 42C failure in the first node 42 for incoming traffic. Therefore, an indication of a failure within a node does not need to be externally communicated by that node.

With the capabilities of the select function 42E and dual feeding between the edge router 42A and the core routers 42C–D, the present invention provides a system architecture 40 in which the failure of a single core router 42C or 42D can be recovered locally without any recovery signaling between nodes over the transport region 44. Recovery signaling is not required between the nodes because the select function 42E checks for local core router failures and allows a single signal to pass. Since only a single signal is being passed from the local node, non-local nodes do not have to choose between a primary data signal and a secondary data signal, thus eliminating the need for node recovery signaling to pass over the transport region 44. This frees the transport network from failure related communications between the nodes.

Figure 6:
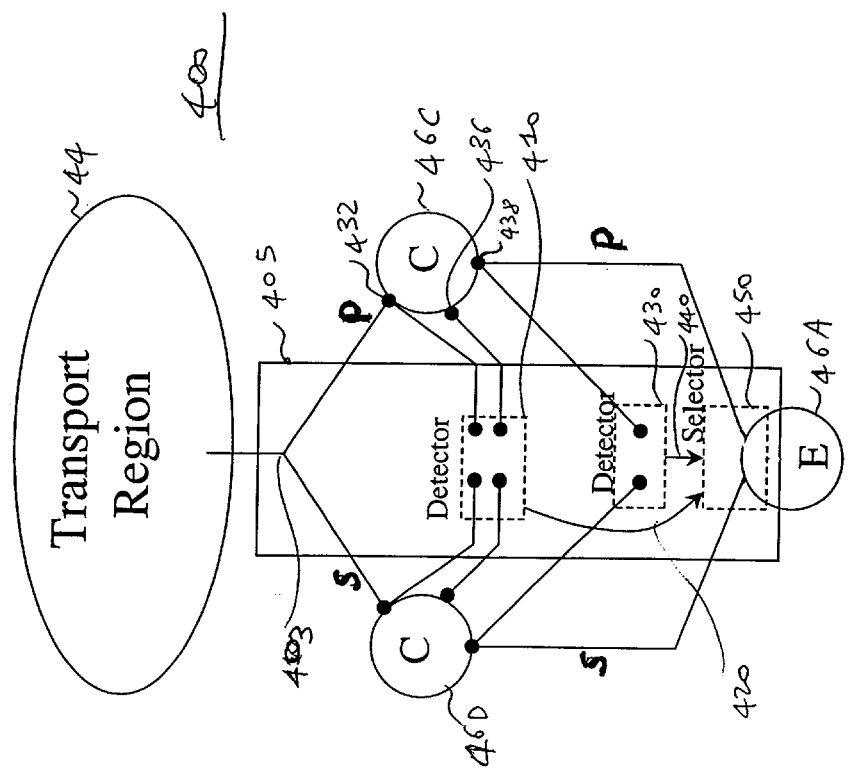
FIG. 6 is a block diagram of the selector for incoming data in FIG. 4 in accordance with the present invention.
Figure 5:
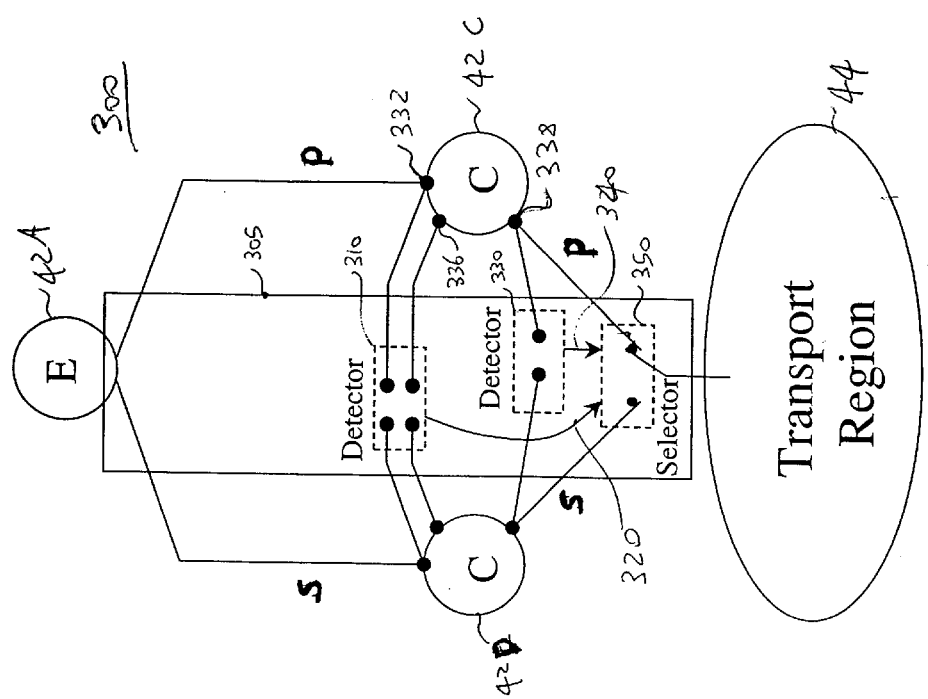
FIG. 5 is a block diagram of the selector for outgoing data in FIG. 4 in accordance with the present invention.

FIGS. 5 and 6, setting forth block diagrams 300 and 400, respectively, illustrate one implementation of the select functions 42E and 46E of FIG. 4 in block diagram form for traffic flowing into the transport region 44 from node 42 and for traffic flowing from the transport region 44 into node 46, respectively, in accordance with the preferred embodiment. Select function 42E is implemented through selector/detector 305 and select function 46E is implemented through selector/detector 405. It will be readily apparent to those skilled in the art that the select functions 42E and 46E can be implemented in other manners without departing from the spirit of the present invention.

In block diagram 300, for traffic flowing from edge router 42A into the transport region 44 through selector/detector 305, the selector/detector 305 comprises two detectors 310 and 330, and a selector 350. Data signals from edge router 42A are dual fed to a primary signal path P and a secondary signal path S which each carry a data signal equivalent to the data signal from edge router 42A. The primary signal is homed to primary core router 42C and the secondary signal is homed to secondary core router 42D.

The detector 310 checks the primary core router 42C for external and internal failures. The detector 310 checks for external primary core router 42C failures by checking the input interface 332 of primary core router 42C for irregularities, in a known manner, such as for a loss of signal (LOS). Internal failures are identified by "pinging" the primary core router 42C at a diagnosis port 336, also in a known manner, to detect failures in the primary core route 42C. Pinging involves sending a diagnosis signal to the diagnosis port 336 of the primary core router 42C, receiving a signal from the primary core router 42C in response to the diagnosis signal, and comparing the response to an expected result. The detector 330 checks for external primary core router 42C failures by checking the output interface 338 of primary core router 42C for irregularities, in a known matter, such as for a loss of signal (LOS). Alternatively, pinging could be implemented in the core routers 42C,D with the detector 310 monitoring the core routers 42C,D for an indication of an internal failure. Detectors capable of identifying external and internal core router failures, such as detectors 310 and 330, are known in the art and are thus not described in detail herein.

Selector 350 controls the flow of the primary data signal P and the secondary data signal S into the transport region 44. In the absence of failures detected by detectors 310 and 330, selector 350 is set to pass the primary data signal P from the primary core router 42C to the transport region 44. If, however, detectors 310 and/or 330 identify a primary core router 42C failure, detectors 310 and/or 330 will communicate the presence of a failure to selector 350 through interface 320 and/or 340. Upon receiving a signal indicating a primary core router 42C failure, selector 350 will switch from passing the primary data signal P out of the primary core router 42C to passing the secondary data signal S out of the secondary core router 42D into the transport region 44. Selector 350 comprises a switch for switching from a primary data signal P to a secondary data signal S with the switch controlled by a signal from the detectors 310 and/or 330. Selector 350 may also comprise other components for terminating and converting the data signals. For example, the selector 350 may terminate optical signals and convert optical signals to electrical signals. Selectors capable of controlling primary and secondary data signals based on an input, such as selector 350, are known in the art and are thus not described in detail herein.

In block diagram 400, for traffic flowing from the transport region 44 into edge router 46A through selector/detector 405, the selector/detector 405 comprises a splitter 403, two detectors 410 and 430, and a selector 450. Splitter 403 receives a new data signal from transport region 44 and creates a primary signal P and a secondary signal S which are each equivalent to the received signal. The primary signal P is passed to primary core router 46C and the secondary signal S is passed to secondary core router 46D. Splitters capable of creating two data signals from a single data signal, such as splitter 403, are known in the art and are thus not described in detail herein.

The detector 410 checks the primary core router 46C for external and internal failures. The detector 410 checks for external primary core router 46C failures by checking the input interface 432 of primary core router 46C for irregularities, in a known manner, such as for a loss of signal (LOS). Internal failures are identified by "pinging" the primary core router 46C at a diagnosis port 436, also in a known manner, to detect failures in the primary core route 46C. Pinging involves sending a diagnosis signal to the diagnosis port 436 of the primary core router 46C, receiving a signal from the primary core router 46C in response to the diagnosis signal, and comparing the response to an expected result. Alternatively, pinging could be implemented in the core routers 46C,D with the detector 410 monitoring the core routers 46C,D for an indication of an internal failure. The detector 430 checks for external primary core router 46C failures by checking the output interface 438 of primary core router 46C for irregularities, in a known matter, such as for a loss of signal (LOS). Detectors 410 and 430 are similar to detectors 310 and 330, and do not require further description.

Selector 450 passes a primary data path P and a secondary data path S to edge router 46A, and directs whether edge router 46A should use the primary data signal P or the secondary data signal S. In the absence of failures detected by detectors 410 and 430, selector 450 will direct edge router 46A to use the primary data signal P from the primary core router 46C. If, however, detectors 410 and/or 430 identify a primary core router 46C failure, detectors 410 and/or 430 will communicate the presence of a failure to selector 450 through interface 420 and/or 440. Upon receiving a signal indicating a primary core router 46C failure, selector 450 will switch from directing edge router 46A to use the primary data signal P out of the primary core router 46C to using the secondary data signal S out of the secondary core router 46D. Selector 450 comprises an indicator for generating a signal informing edge router 46A of which path to use based on a signal from the detectors 410 and/or 430. Selector 450 may also comprise other components for terminating and converting the data signals. For example, the selector 450 may terminate electrical signals and convert electrical signals to optical signals. Selectors capable of generating an output based on an input, such as selector 450, are known in the art and are thus not described in detail herein.

The select functions 42E and 46E of FIG. 4 can be implemented in any well known manner, for example, through hardware using discrete components or integrated circuits, or a combination of software running on a processor and hardware (e.g., APS, Standard 1+1 Protection, OSPF, MPLS, . . . ). Additionally, the description and illustrations of the architecture incorporating the select function only illustrates the case when a primary path and its protection path are homed to two core routers physically located in the same geographical area. However, this is not a limitation of the select function. The primary and secondary paths may be homed to core routers physically located in diverse geographical areas. In such a case the select function can be distributed across two transport network elements (one to which the primary path is homed and the other to which the secondary path is homed) using embedded transport network signaling.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. For example, the number of regions, paths, and routers were chosen to facilitate discussion. Many more regions, paths, and routers could be used without departing from the spirit of the present invention. Accordingly, the foregoing description is by way of example only, and not limiting. The invention is limited only as defined in the following claims and equivalents thereto.

What is claimed is:

1. A node capable of handling node failures, said node having a first core router, a second core router, and at least one edge router homed to said first core router and said second core router, said node comprising:

a select function coupled to said first and second core routers, said select function capable of detecting and recovering failures in said node, such that failures in said node are recovered within said node.

2. The node of claim 1 adaptable to work within a network architecture.

3. A nodal system capable of recovering from nodal failures comprising:

a first node, said first node having a first core router, a second core router, and at least one edge router homed to said first core router and said second core router, said node comprising a first select function, said first node capable of recovering from a first failure in said first node within said first node; and a second node, said second node having a first core router, a second core router, and at least one edge router homed to said first core router and said second core router, said node comprising a second select function couplable to said first node, said second node capable of recovering from a second failure in said second node within said second node, such that indicators of said first and said second failures are not communicated between said first and second nodes.

4. The nodal system of claim 3, wherein said first and second nodes are coupled through a transport network capable of detecting and recovering from failures in said transport network, such that failures in said first and second node are not communicated over said transport network, thus freeing said transport network from failure related communications from said first and second nodes.

5. A network architecture for handling network failures comprising:

a transport network capable of detecting and recovering from a failure in said transport network; and a first node, said first node having a first core router, a second core router, and at least one edge router homed to said first core router and said second core router, said node comprising a first select function coupled to said transport network, said first select function capable of detecting and recovering from failures in said first node, such that failures in said first node are not communicated over said transport network.

6. The network architecture of claim 5, said network architecture further comprising;

a second node comprising a second select function coupled to said transport network, said second select function capable of detecting and recovering from failures in said second node, such that failures in said first node are not communicated to said second node and failures in said second node are not communicated to said first node, thus freeing said transport network from failure related communications between said first and second nodes.

7. The network architecture of claim 6, wherein; said second node further comprises:

third core router coupled to said second select function, a fourth core router coupled to said second select function, and a second edge router homed to said third core router and said fourth core router.

8. The network architecture of claim 7, wherein for traffic routed from said first edge router to said transport network, said first select function selects traffic routed through one of said first and second core routers for delivery to said transport network.

9. The network architecture of claim 8, wherein said first select function is capable of detecting failures in said first and second core routers and selects traffic routed through one of said first and second core routers based on said detected failures.

10. The network architecture of claim 7, wherein for traffic routed from said transport network to said second edge router, said second select function directs said second edge router to use traffic routed through one of said third and fourth core routers.

11. The network architecture of claim 10, wherein said second select function is capable of detecting failures in said third and fourth core routers and directs said second edge router to use traffic routed through one of said third and fourth core routers based on detected failures.

12. The network architecture of claim 7, wherein said first core router is located in the same geographical location as said second core router.

13. The network architecture of claim 7, wherein said first core router is located,in a geographical area diverse to said second core router.

14. The network architecture of claim 6, wherein said transport network uses a shared protection scheme.

15. A node recovery method comprising the step of:

recovering from a node failure within a node having a first core router, a second core router, and at least one edge router homed to said first core router and said second core router, such that in recovering from said node failure an indicator of said node failure is not externally communicated by said node.

16. A nodal recovery method comprising the steps of:

recovering from a first node failure within a first node having a first core router, a second core router, and at least one edge router homed to said first core router and said second core router; and recovering from a second node failure within a second node having a first core router, a second core router, and at least one edge router homed to said first core router and said second core router, such that indicators of said first and second node failures are not communicated between said first and second nodes.

17. A network recovery method comprising the steps of:

recovering from a transport network failure in a transport network; and recovering from a failure in a first node having a first core router, a second core router, and at least one edge router homed to said first core router and said second core router within said first node, such that in recovering from said failure an indicator of said failure is not communicated to a second node over said transport network.

18. The method of claim 17, wherein said step of recovering from said failure in said first node comprises the steps of:

recovering from said failure in said first node when traffic is flowing from said first node to said transport network, said step comprising the steps of;
  homing traffic from an edge router to said first and second core routers,
  identifying a failure in said first or second core router with a select function, and
  selecting traffic from either said first or second core router for delivery to said transport network based on said select function; and recovering from said failure in said first node when traffic is flowing from said transport network to said first node, said step comprising the steps of;
  duplicating traffic from said transport network with said select function,
  passing said traffic to said first and second core routers,
  passing said traffic from said first and second core routers to said edge router, and
  directing said edge router to use traffic from either said first or second core router based on said select function.

19. The method of claim 17, wherein said step of recovering from said failure in said first node comprises the steps of:

homing data from an edge router to said first core router and said second core router in said first node;

selecting said data from either said first core router or said second core router based on a select function incorporated into said first node, said select function selecting said data based detecting failures in said first or second core routers;

passing said data from the selected core router to said transport network, such that failures in said node are managed by said select function and do not require signals indicating said failures in said first node to pass over said transport network.

20. The method of claim 17, wherein said step of recovering from said failure in said first node comprises the steps of:

duplicating traffic from said transport network with a select function;

passing said traffic to said first core router and a said second core router in said first node;

passing said traffic from said first and second core routers to an edge router; and directing said edge router to use said traffic from either said first core router or said second core router based on said select function in said node, said select function directing said edge router based on detecting failures in said first or second core routers, such that failures in said node are managed by said select function and do not require signals indicating said failures in said node to pass over said transport network.

21. A dual homing node for interfacing with a transport network, said node capable of locally handling node failures comprising:

an edge router passing a first data signal;

a primary core router;

a secondary core router;

a select function comprising;
  a splitter coupled to said edge router for receiving said first data signal, said splitter generating a primary data signal and passing said primary data signal to said primary core router, and generating a secondary data signal and passing said secondary data signal to said secondary core router, each of said primary and secondary data signals being identical to said first data signal,
  one or more detectors for detecting a failure in said primary core router, and
  a selector operably coupled to said one or more detector, said primary core router, said secondary core router, and said transport network, said selector configured to normally pass said primary data signal flowing through said primary core router to said transport network, and to pass said secondary data signal flowing through said secondary core router to said transport network if said failure is detected in said primary core router by said detectors, such that only one of said primary and secondary data signals is passed to said transport network.

22. A dual homing node to interfacing with a transport network, said node capable of locally handling node failures comprising:

a primary core router;

a secondary core router;

an edge router;

a select function comprising;
  a splitter coupled to said transport network for receiving a first data signal from said transport network, said splitter generating a primary data signal and passing said primary data signal to said primary core router, and generating a secondary data signal and passing said secondary data signal to said secondary core router, each of said primary and secondary data signals being identical to said first data signal,
  one or more detectors coupled to said primary core router for detecting a failure in said primary core router, and a selector operably coupled to said one or more detectors, said primary core router, said secondary core router, and said edge router, said selector configured to pass said primary data signal flowing through said primary core router and said secondary data signal flowing through said secondary core router to said edge router, said selector normally directing said edge router to use said primary data signal, and to use said secondary data signal if said failure is detected in said primary core router, such that only one of said primary and secondary data signals is passed by said edge router.

* * * * *